US007377850B2

(12) United States Patent
Shackelford et al.

(10) Patent No.: US 7,377,850 B2
(45) Date of Patent: May 27, 2008

(54) GAMING DEVICE HAVING MULTIPLE BONUSES ACTING INDEPENDENTLY OR SIMULTANEOUSLY

(75) Inventors: Micheal Shackelford, Henderson, NV (US); Nathanial Hammond, Las Vegas, NV (US); Dom Tiberio, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 220 days.

(21) Appl. No.: 10/957,007

(22) Filed: Oct. 1, 2004

(65) Prior Publication Data

US 2006/0073878 A1 Apr. 6, 2006

(51) Int. Cl.
*A63F 9/24* (2006.01)
*G06F 17/00* (2006.01)

(52) U.S. Cl. ............................ 463/20; 463/21; 463/22

(58) Field of Classification Search .................. 463/19, 463/20

See application file for complete search history.

(56) References Cited

U.S. PATENT DOCUMENTS

| | | | | |
|---|---|---|---|---|
| 5,205,555 | A * | 4/1993 | Hamano | 273/143 R |
| 6,004,207 | A * | 12/1999 | Wilson, Jr. et al. | 463/20 |
| 6,033,307 | A * | 3/2000 | Vancura | 463/20 |
| 6,105,296 | A * | 8/2000 | Inaba | 40/707 |
| 6,334,814 | B1 * | 1/2002 | Adams | 463/46 |
| 6,358,146 | B1 * | 3/2002 | Adams | 463/20 |
| 6,569,015 | B1 * | 5/2003 | Baerlocher et al. | 463/16 |
| 6,612,574 | B1 * | 9/2003 | Cole et al. | 273/138.1 |
| 6,634,945 | B2 * | 10/2003 | Glavich et al. | 463/25 |
| D486,869 | S * | 2/2004 | Webb et al. | D21/370 |
| 6,997,804 | B2 * | 2/2006 | Berman | 463/20 |
| 2003/0148804 | A1 * | 8/2003 | Ikeya et al. | 463/16 |
| 2004/0051239 | A1 * | 3/2004 | Seelig et al. | 273/138.1 |
| 2004/0082373 | A1 * | 4/2004 | Cole et al. | 463/13 |
| 2005/0043081 | A1 * | 2/2005 | Baerlocher | 463/20 |
| 2005/0255903 | A1 * | 11/2005 | Jackson | 463/16 |
| 2006/0068892 | A1 * | 3/2006 | Gomez et al. | 463/20 |
| 2006/0189378 | A1 * | 8/2006 | Aoki | 463/20 |

* cited by examiner

*Primary Examiner*—Robert E Pezzuto
*Assistant Examiner*—Sunit Pandya
(74) *Attorney, Agent, or Firm*—Brooke W. Quist, Esq.; J. P. Cody, Esq.

(57) ABSTRACT

A multiple bonus modifier game 10 includes a base game and two or more base award modifiers operating independently or simultaneously of each other (i.e., the two or more base award modifiers operate independently of each other or in conjunction with each other to modify a base game award). The multiple bonus modifier game 10 comprises a base game 20 that includes a plurality of spinning reels, a first base award modifier 30 that includes at least one spinning reel, and a second base award modifier 40 that includes at least one additional spinning reel. The outcome of the spinning reels in the base game 20 defines a base game award 25. The outcome of the spinning reel in the first base award modifier 30 defines a first modifier award 35, which adjusts the base game award. The outcome of the additional spinning reel in the second base award modifier 40 defines a second modifier award 45, which potentially adjusts the combined base game award 25 and first modifier award 35, if both awards are given.

29 Claims, 3 Drawing Sheets

GAMING DEVICE HAVING MULTIPLE BONUSES ACTING INDEPENDENTLY OR SIMULTANEOUSLY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a reel spinning game, and more particularly, to a reel spinning game having multiple bonus reels acting independently or in conjunction with the award in the base reel spinning game.

BACKGROUND OF THE INVENTION

A standard slot machine includes between three and five rotatable reels for use in game play. On the periphery of each reel are gaming symbols, such as assorted fruit, numbers, and/or bar symbols. The reels are caused to spin until each reel reaches a resting position. The success or failure of the game is then determined by comparing the combination of reel symbols that are displayed when the reels are in their resting positions.

To add interest to the game, many different types of slot machines have developed over time. For example, in some slot machines the display windows show more than one adjacent symbol on each reel, thereby allowing betting involving multiple rows. Other types of slot machines have also been developed to increase player interest that include "second chance" games. Typically, "second chance" games try to maintain player interest from a first game segment to a second game segment by providing the player with another opportunity to win.

Additionally, a variety of bonus games have been produced in which a slot machine pays out a final award by adding a single value to, or multiplying a basic slot machine pay award. One such game is a 4-reel slot machine. In such a game, the first three reels embody a basic slot machine game with base pays published on a pay table. For example, 3 bars might pay 10 credits. The $4^{th}$ reel contains bonus actions that are applied to any base pay if a valid base pay and a bonus action appears on the pay line at the same time. Thus, in one example, the base pay might be multiplied by 10, have 100 added to its value, or respin a random number of times, thereby accumulating some random multiple of the base pay.

Others have produced bonus devices such as secondary wheel games or top box games to provide a bonus game that produces a payment or adds to a base pay on the basic slot machine. These add-on games are more complicated for players to understand and more expensive to produce.

However, there is a continuing need for additional slot machine variants that provide a player with enhanced excitement and diversity of game play, without departing so far from the original slot gaming concept that player comfort is lost. Further, there is a continuing need for a gaming machine that provides increased player excitement due to the visual entertainment that occurs specifically in response to the player's actions. Additionally, there is a continuing need for a gaming machine that provides maintains a high rate of game play speed so that the number of games played is not substantially reduced by the variation from the original slot gaming concept. Accordingly, those skilled in the art have long recognized the need for a gaming machine that addresses these issues. This invention clearly fulfills these and other needs.

SUMMARY OF THE INVENTION

Briefly, and in general terms, the present invention resolves the above and other problems by providing a gaming machine having a base game and two or more base award modifiers operating independently or simultaneously (i.e., two or more base award modifiers operating independently or in conjunction with one another to modify a base game award). The gaming machine includes: indicia of a plurality of spinning reels employed in a base game, indicia of at least one spinning reel employed as a first base award modifier, and indicia of at least one spinning reel employed as a second base award modifier.

Preferably, the base game includes indicia of a plurality of spinning reels that are spun in the base game. The outcome of the indicia of spinning reels defines a base game award, if any. Preferably, the first base award modifier includes indicia of at least one spinning reel that is spun during the first base award modifier. The outcome of the at least one spinning reel indicia in the first base award modifier defines a first modifier award, if any. The first modifier award adjusts the base game award. Preferably, the second base award modifier includes indicia of at least one additional spinning reel that is spun during the second base award modifier. The outcome of the at least one addition spinning reel indicia in the second base award modifier defines a second modifier award, if any. The second modifier award adjusts the combined base game award and the first modifier award if both awards were given, adjusts only the base game award if only the base game award was given, and adjusts only the first modifier award if only the first modifier award was given. Thus, the first modifier award and the second modifier award operate independently or in conjunction with one another to modify a base game award.

In accordance with another aspect of a preferred embodiment, the outcome of the indicia of a plurality of spinning reels, the outcome of the indicia of the at least one spinning reel, and the outcome of the indicia of the at least one additional spinning reel, are all displayed along a payline. In one preferred embodiment, the indicia of a plurality of spinning reels spins about a substantially horizontal axis, and at least one spinning reel of the base award modifiers spins about a substantially vertical axis. In another preferred embodiment, the indicia of a plurality of spinning reels spins about a substantially horizontal axis, and at least one of the base award modifiers spins in a top box game. In accordance with another aspect of a preferred embodiment, the base game requires three coins to initiate base game play, the first base award modifier requires a forth coin to initiate the first modifier play, and the second base award modifier requires a fifth coin to initiate second modifier play.

In accordance with another aspect of a preferred embodiment, any first modifier award from the first base award modifier is added to any base game award from the base game. In accordance with another aspect, a first modifier award from the first base award modifier is awarded only if a base game award was given. In accordance with still another aspect, a first modifier award from the first base award modifier is awarded regardless of whether a base game award was given. In accordance with yet another aspect, a first modifier award from the first base award modifier rewards a player with additional reel spins. In another preferred embodiment, a second modifier award from the second base award modifier is a multiplier of the base pay award, if any, and the first modifier award, if any.

In accordance with another preferred embodiment, the gaming machine also has a base game and two or more base award modifiers operating independently or in conjunction with one another to modify a base game award. Specifically, this preferred embodiment of the gaming machine includes a base game, a first base award modifier, and a second base award modifier. The outcome of the base game defines a base game award, if any. The outcome of the first base award modifier defines a first modifier award, if any. Preferably, the first modifier award adjusts the base game award, if any. The outcome of the second base award modifier defines a second modifier award, if any. Preferably, the second modifier award adjusts the combined base game award and the first modifier award if both awards were given, adjusts only the base game award if only the base game award was given, and adjusts only the first modifier award, if only the first modifier award was given. In this manner, the first modifier award and the second modifier award operate independently or in conjunction with one another to modify a base game award.

In accordance with another preferred embodiment, the gaming machine includes: a base game presentation of a plurality of spinning reels, a first base award adjuster, and a second base award adjuster. In one such preferred embodiment, at least one of the first adjuster awards include a nil adjustment, and at least one of the second adjuster awards includes a nil adjustment. Preferably, the second adjuster award alters the combined base game award and first modifier award if the base game award is given and the second adjuster award is a non-nil adjustment, alters only the base game award if the base game award was given and the second adjuster award includes a nil adjustment, and alters only the first adjuster award if no base game award was given and the first adjuster award is a non-nil adjustment and stands independently of a base game award.

In accordance with another preferred embodiment, the gaming machine includes: a base game presentation of a plurality of spinning reels, a first base award adjuster, and a second base award adjuster. In one such preferred embodiment, at least one of the first adjuster awards include a negative adjustment, and at least one of the second adjuster awards including a negative adjustment. Preferably, the second adjuster award alters the combined base game award and first modifier award if the base game award is given and the second adjuster awards including a non-negative adjustment, alters only the base game award if the base game award was given and the second adjuster award including a negative adjustment, and alters only the first adjuster award if no base game award was given and the first adjuster award stands independently of a base game award.

In accordance with another preferred embodiment, the gaming machine includes: a base game, means for modifying a first base award, and means for modifying a second base award. Preferably, the second modifier award adjusts the combined base game award and first modifier award if both awards were given, adjusts only the base game award if only the base game award was given, and adjusts only the first modifier award if only the first modifier award was given.

Other features and advantages of the present invention will become apparent from the following detailed description, taken in conjunction with the accompanying drawings, which illustrate by way of example, the features of the present invention.

DETAILED DESCRIPTION OF THE PREFERRED EMBODIMENTS

Figure 1:
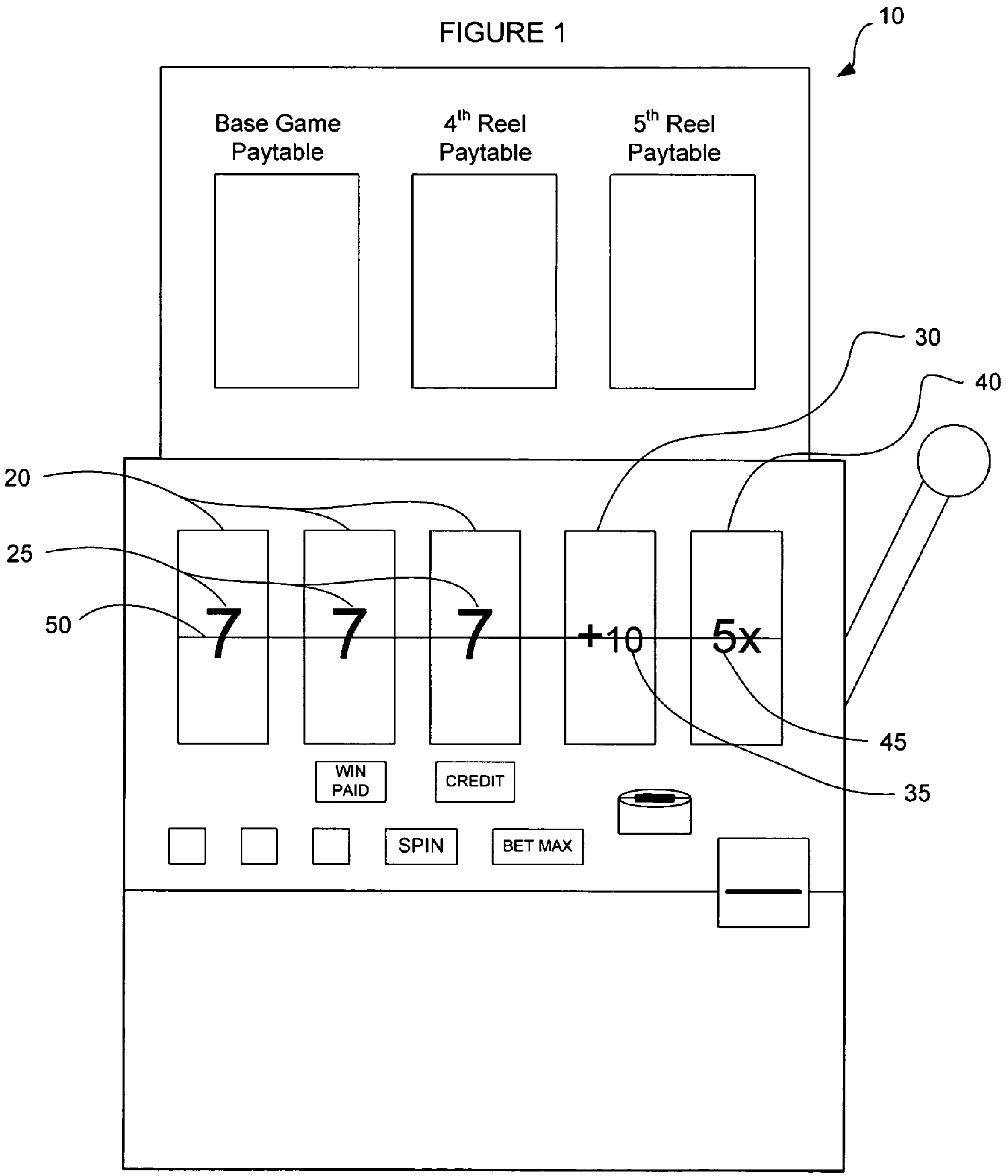
FIG. 1 illustrates a front view of a preferred embodiment of a multiple bonus modifier game, constructed in accordance with the claimed invention, having a base game and two or more base award modifiers operating independently or simultaneously of each other.

A preferred embodiment gaming machine, implemented in accordance with the claimed invention, provides a player with the opportunity to play a base game in conjunction with two or more base award modifiers that operate independently or in conjunction with one another to modify a base game award. In this manner, player excitement is derived and heightened from the visual entertainment that occurs when the multiple base award modifiers act to increase the opportunities for a player to win, as well as the magnitude of those winnings. Referring now to the drawings, wherein like reference numerals denote like or corresponding parts throughout the drawings, and more particularly to FIGS. 1-2, there is shown a preferred multiple bonus modifier game 10.

Referring now to FIG. 1, a multiple bonus modifier game 10 preferably includes a base game and two or more base award modifiers operating independently or simultaneously of each other (i.e., the two or more base award modifiers operate independently of each other or in conjunction with each other to modify a base game award). Specifically, the multiple bonus modifier game 10 comprises: a base game 20 that includes a plurality of spinning reels, a first base award modifier 30 that includes at least one spinning reel, and a second base award modifier 40 that includes at least one additional spinning reel. It will be appreciated by those of skill in the art that whenever spinning reels are described herein, any indicia of spinning reels may be used without departing from the scope of the claimed invention. Such indicia of spinning reels include, by way of example only, and not by way of limitation, physical spinning reels, a video display of spinning reels, or other gaming presentations of spinning reels.

Preferably, the plurality of reels in the base game 20 is spun (or appears to be spun in the case of video representation embodiments). The outcome of the spinning reels in the base game 20 defines a base game award 25, if any (i.e., the outcome does not always produce an award). Additionally, the reel in the first base award modifier 30 is also spun. The outcome of the spinning reel in the first base award modifier 30 defines a first modifier award 35, if any (i.e., the outcome does not always produce an award). The first modifier award adjusts the base game award. Further, the at least one additional reel in the second base award modifier 40 is also spun. The outcome of the additional spinning reel in the second base award modifier 40 defines a second modifier award 45, if any (i.e., the outcome does not always produce an award). The second modifier award 45 (1) adjusts the combined base game award 25 and first modifier award 35 if both awards were given, (2) adjusts only the base game award 25 if only the base game award was given, and (3) adjusts only the first modifier award 35 if only the first modifier award was given. Thus, the first modifier award 35 and the second modifier award 45 operate independently or in conjunction with one another to modify a base game award 25.

As briefly described above, in a preferred embodiment of the multiple bonus modifier game 10 the two or more base award modifiers operate independently or simultaneously (in conjunction) with each other and the base award 25. Operating "independently" in this context means that each award will stand independently, regardless of whether or not another award was won. Specifically, if a base game award 25 was won, a first modifier award 35 was won, and a second modifier award 45 was lost, the base game award 25 and the first modifier award 35 would be given. If a base game award 25 was won, a first modifier award 35 was lost, and a second modifier award 45 was won, the base game award 25 and second modifier award 45 would be given. Further, in some preferred embodiments, if a base game award 25 was won, a first modifier award 35 was lost, and a second modifier award 45 was lost, the base game award 25 still would be given. Moreover, in other preferred embodiments, if a base game award 25 was lost, a first modifier award 35 was won, and a second modifier award 45 was won, the first modifier award 35 and the second modifier award 45 would be given.

In comparison, operating "simultaneously" or "in conjunction with" in this context means that each award can be given at the same time as another award is given. Specifically, if a base game award 25 was won, a first modifier award 35 was won, and a second modifier award 45 was won, the base game award 25 and the first modifier award 35 and the second modifier award 45 would all be given together in combination. Accordingly, in a preferred embodiment of the multiple bonus modifier game 10, if two bonus modifier awards (e.g., the first base award modifier 30 and the second base award modifier 40) appear on the payline 50 along with a valid base pay, both actions are applied to the base pay. For example, three bars pay out 10 credits in the base game 20. Next, a "+10 credits" symbol is achieved on the fourth reel (i.e., first base award modifier 30). Finally, a "times 2" multiplier is achieved on the fifth reel (second base award modifier 40). All symbols lie on the payline 50. The resulting pay is (10+10) "times 2" or 40 credits. Thus, the multiple bonus modifier game 10 is faster to play than a standard primary game with a "secondary" bonus. Furthermore, the machine is less expensive to produce. Moreover, the payouts are more exciting than a standard primary game with a "secondary" bonus.

In a preferred embodiment of the multiple bonus modifier game 10, the outcome of the plurality of spinning reels in the base game 20, the outcome of the at least one spinning reel in the first base award modifier 30, and the outcome of the at least one additional spinning reel in the second base award modifier 40, are all displayed along a payline 50. Accordingly, in a preferred embodiment, the first three reels depict the basic slot machine game 20 with the base pay published on a pay table. In one exemplary embodiment of the base game 20, three bars pay out 10 credits. Continuing, in this embodiment, the fourth reel 30 and fifth reel 40 produce bonus actions (i.e., modifier awards 35 and 45) that are applied to a base game award 25. In one such example, the base game award 25 is multiplied by 10, has 100 credits added to its value, or another similar modifier.

Figure 2:
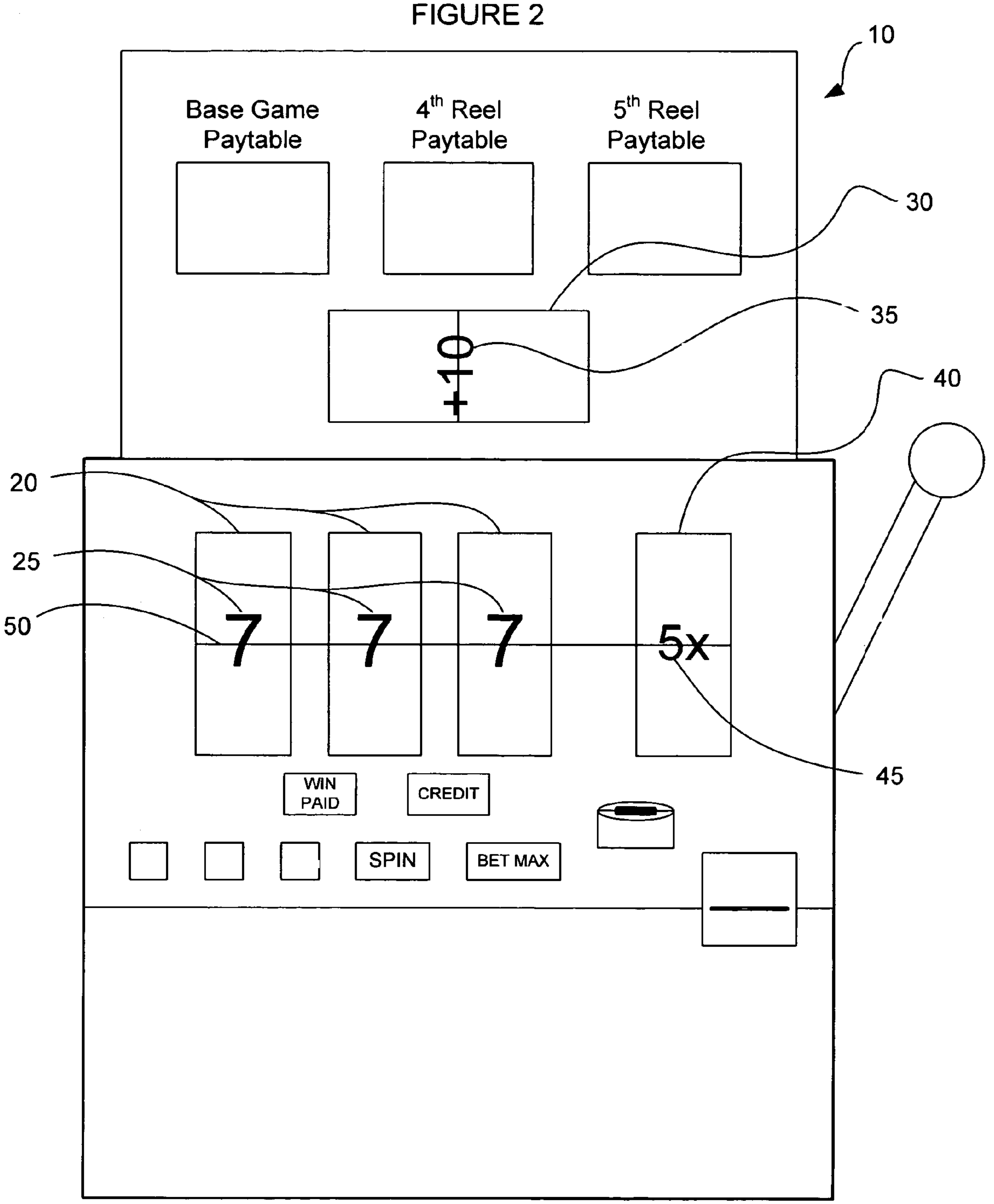
FIG. 2 illustrates a front view of the another preferred embodiment of a multiple bonus modifier game, constructed in accordance with the claimed invention, having reels in a base game and a reel in a second base award modifier spinning about a substantially horizontal axis, while a reel in a first base award modifier spins about a substantially vertical axis.
Figure 3:
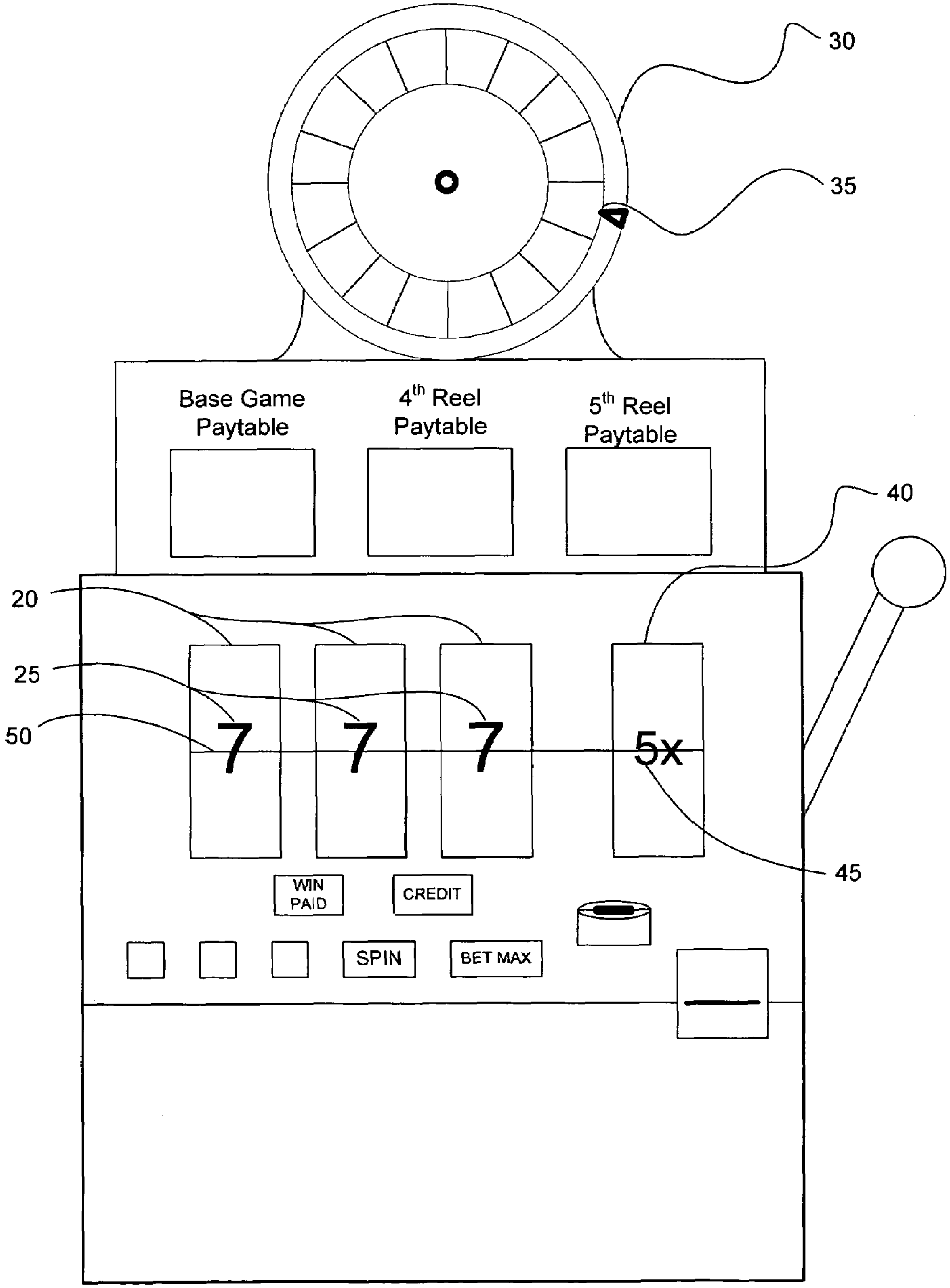
FIG. 3 illustrates a front view of the another preferred embodiment of a multiple bonus modifier game, constructed in accordance with the claimed invention, having reels in a base game and a reel in a second base award modifier spinning about a substantially horizontal axis, while a reel in a first base award modifier spins about a substantially vertical axis.

Additionally, in one preferred embodiment, the spinning reels in the base game 20 spin about a substantially horizontal axis, while at least one reel of the base award modifiers 30 and/or 40 spins about a substantially vertical axis (as shown in FIG. 2). Further, in another preferred embodiment, the spinning reels in the base game 20 spin about a substantially horizontal axis, while a wheel of the base award modifiers 30 and/or 40 spins in a top box game (as shown in FIG. 3). Accordingly, in a preferred embodiment of the multiple bonus modifier game 10, the first base award modifier 30 and/or the second base award modifier 40 include a trigger on one of the reels that can be modified by the other bonus reel. Thus, in one exemplary preferred embodiment, a "Monte Carlo style" bonus wheel could be triggered by a special symbol on the fourth reel (i.e., the first base award modifier) while an additional multiplier could appear on the fifth reel (i.e., the second base award modifier).

Referring again to FIG. 1, in one preferred embodiment of the multiple bonus modifier game 10, any first modifier award 35 from the first base award modifier 30 is then added to any base game award 25 from the base game 20. Additionally, in one preferred embodiment, a first modifier award 35 from the first base award modifier 30 is awarded only if a (non-zero) base game award was given. However, in another preferred embodiment, a first modifier award 35 from the first base award modifier 30 is awarded regardless of whether a base game award 25 was given. Moreover, in one preferred embodiment, a first modifier award 35 from the first base award modifier 30 rewards a player with additional reel spins. In another preferred embodiment, a second modifier award 45 from the second base award modifier 40 is a multiplier of the base pay award 25, if any (i.e., the base pay award 25 is not zero), and the first modifier award 35, if any (i.e., first modifier award 35 is not zero), in combination.

In a preferred "five coin" embodiment of the multiple bonus modifier game 10, the base game 20 requires three coins to initiate base game play, the first base award modifier 30 requires a forth coin to initiate a first modifier play, and the second base award modifier 40 requires a fifth coin to initiate a second modifier play. Accordingly, the player "buys" these bonuses by paying for an extra coin for each of the bonus reels. Thus, in one preferred embodiment of a "five coin" game, the first three coins purchase any base game award from the base game that may appear on reels 1-3. The fourth coin purchases any bonuses that may appear on reel 4. The fifth coin purchases any bonuses that may appear on reel 5. In one preferred embodiment of the multiple bonus modifier game, reel 4 is an "adder" bonus, and reel 5 is a "multiplier" bonus. Since multipliers are generally more powerful than adders, the player is encouraged to insert the 5th coin.

In another preferred embodiment of the multiple bonus modifier game 10, it includes a base game 20, a first base award modifier 30, and a second base award modifier 40, in which at least one of the base game 20, first base award modifier 30, and second base award modifier 40 does not include spinning reels. In all other respects this embodiment of the multiple bonus modifier game 10 resembles the embodiments discussed above. The gaming format utilized in this (at least partially non-spinning reel) multiple bonus modifier game 10 includes by way of example only, and not be way of limitation, poker, various other card games, and the like. It will be appreciated by those skilled in the art that other known gaming formats may also be utilized.

In another preferred embodiment of the multiple bonus modifier game 10, at least one of the first modifier awards 35 from the first base award modifier 30 rewards a player with a nil adjustment. Correspondingly, at least one of the second modifier awards 45 from the second base award modifier 40 rewards a player with a nil adjustment. In this context, a "nil adjustment" is an "award" that does not alter the original base award 20 (e.g., adding zero to a base award, multiplying a base award times one, and the like).

In still another preferred embodiment of the multiple bonus modifier game 10, at least one of the first modifier awards 35 from the first base award modifier 30 gives a player a negative adjustment. Correspondingly, at least one of the second modifier awards 45 from the second base award modifier 40 gives a player a negative adjustment. In this context, a "negative adjustment" is an "award" that negatively alters the original base award 20 (e.g., subtracting credits from a base award, multiplying a base award times a fraction, and the like).

A preferred embodiment of the multiple bonus modifier game 10 includes multiple bonus reels working independently and/or in conjunction with one another to modify a base game award. One preferred embodiment utilizes a stepper-motor slot system with five spinning reels. However, as stated above, in another preferred embodiment, the multiple bonus modifier game 10 is incorporated into a video slot machine having five or more reels.

Furthermore, the various methodologies described above are provided by way of illustration only and should not be construed to limit the invention. Those skilled in the art will readily recognize various modifications, and changes may be made to the present invention without departing from the true spirit and scope of the present invention. Accordingly, it is not intended that the invention be limited, except as by the appended claims.

What is claimed is:

1. A gaming machine having a base game and two base award modifiers to modify a base game award in a single spin game, the gaming machine comprising:

indicia of a plurality of spinable reels employed in a single spin base game, wherein the outcome of the indicia of spinable reels in the single spin base game define a base game award, if any;

indicia of at least one spinable reel employed as a first single spin base award modifier, wherein the outcome of the at least one spinable reel indicia in the first single spin base award modifier defines a first modifier award, if any, and wherein the first modifier award adjusts the base game award; and indicia of at least one additional spinable reel employed as a second single spin base award modifier; wherein the outcome of the at least one addition spinable reel indicia in the second single spin base award modifier defines a second modifier award, if any, and wherein the second modifier award adjusts the combined base game award and first modifier award if both awards were awarded, adjusts only the base game award if only the base game award was awarded, and adjusts only the first modifier award if only the first modifier award was awarded;

wherein the first single spin base award modifier and the second single spin base award modifier are awarded regardless of whether the base game award is awarded;

wherein the plurality of spinable reels in the single spin base game, the spinable reel in the first single spin base award modifier, and the spinable reel in the second single spin base award modifier are all uniformly spin activated a single time, and are not subject to independent activation or re-activation; and wherein all spin activations of the spinable reels of the first and second single spin base award modifiers are in response to causing the single spin game to begin.

2. The gaming machine of claim 1, wherein the outcome of the indicia of a plurality of spinable reels, the outcome of the indicia of the at least one spinable reel, and the outcome of the indicia of the at least one additional spinable reel, are all displayed along a payline.

3. The gaming machine of claim 1, wherein the indicia of a plurality of spinable reels spins about a substantially horizontal axis, and wherein at least one of the base award modifiers spins about a substantially vertical axis.

4. The gaming machine of claim 1, wherein the indicia of a plurality of spinable reels spins about a substantially horizontal axis, and wherein at least one of the base award modifiers spins in a top box game.

5. The gaming machine of claim 1, wherein the base game requires three coins to initiate base game play, the first base award modifier requires a forth coin to initiate first modifier play, and the second base award modifier requires a fifth coin to initiate second modifier play.

6. The gaming machine of claim 1, wherein any first modifier award from the first base award modifier is added to any base game award from the base game.

7. The gaming machine of claim 1, wherein a first modifier award from the first base award modifier is awarded only if a base game award was awarded.

8. The gaming machine of claim 1, wherein a first modifier award from the first base award modifier is awarded regardless of whether a base game award was awarded.

9. The gaming machine of claim 1, wherein a second modifier award from the second base award modifier is a multiplier of the base pay award, if any, and the first modifier award, if any.

10. A gaming machine having a base game and two base award modifiers to modify a base game award in a single spin game, the gaming machine comprising:

a base game, wherein the outcome of the base game defines a base game award, if any;

a first base award modifier, wherein the outcome of the first base award modifier defines a first modifier award, if any, and wherein the first modifier award adjusts the base game award, if any; and a second base award modifier; wherein the outcome of the second base award modifier defines a second modifier award, if any;

wherein the second modifier award adjusts the combined base game award and first modifier award if both awards were awarded, adjusts only the base game award if only the base game award was awarded, and adjusts only the first modifier award if only the first modifier award was awarded;

wherein the plurality of spinable reels in the single spin base game, the spinable reel in the first single spin base award modifier, and the spinable reel in the second single spin base award modifier are all uniformly spin activated a single time, and are not subject to independent activation or re-activation; and wherein all spin activations of the spinable reels of the first and second single spin base award modifiers are in response to causing the single spin game to begin.

11. The gaming machine of claim 10, wherein the outcome of the base game, the outcome of the first base award modifier, and the outcome of the second base award modifier, are all displayed along a payline.

12. The gaming machine of claim 10, wherein one or more spinable elements in the base game spin about a substantially horizontal axis, and wherein at least one of the base award modifiers spins about a substantially vertical axis.

13. The gaming machine of claim 10, wherein one or more spinable elements in the base game spin about a substantially horizontal axis, and wherein at least one of the base award modifiers spins in a top box game.

14. The gaming machine of claim 10, wherein the base game requires three coins to initiate base game play, the first base award modifier requires a forth coin to initiate first modifier play, and the second base award modifier requires a fifth coin to initiate second modifier play.

15. The gaming machine of claim 10, wherein any first modifier award from the first base award modifier is added to any base game award from the base game.

16. The gaming machine of claim 10, wherein a first modifier award from the first base award modifier is awarded only if a base game award was awarded.

17. The gaming machine of claim 10, wherein a first modifier award from the first base award modifier is awarded regardless of whether a base game award was awarded.

18. The gaming machine of claim 10, wherein a second modifier award from the second base award modifier is a multiplier of the base pay award, if any, combined with the first modifier award, if any.

19. A gaming machine having a base game and two base award modifiers to modify a base game award in a single spin game, the gaming machine comprising:

a base game presentation of a plurality of spinable reels, wherein the outcome of the spinable reels in the base game presentation defines a base game award, if any;

a first base award adjuster, wherein the outcome of the first base award adjuster defines one of a plurality of first adjuster awards, at least one of the first adjuster awards including a nil adjustment, and wherein the first adjuster award alters the base game award; and a second base award adjuster, wherein the outcome of the second base award adjuster defines one of a plurality of second adjuster awards, at least one of the second adjuster awards including a nil adjustment;

wherein the second adjuster award alters the combined base game award and the first modifier award if the base game award is awarded and the second adjuster awards including a non-nil adjustment, alters only the base game award if the base game award was awarded and the second adjuster award including a nil adjustment, and alters only the first adjuster award if no base game award was awarded and the first adjuster award stands independently of a base game award;

wherein the first base award modifier and the second base award modifier are awarded regardless of whether the base game award is awarded;

wherein the plurality of spinable reels in the single spin base game, the spinable reel in the first single spin base award modifier, and the spinable reel in the second single spin base award modifier are all uniformly spin activated a single time, and are not subject to independent activation or re-activation; and wherein all spin activations of the spinable reels of the first and second single spin base award modifiers are in response to causing the single spin game to begin.

20. The gaming machine of claim 19, wherein the outcome of the base game presentation, the outcome of the first base award adjuster, and the outcome of the second base award adjuster are all displayed along a payline.

21. The gaming machine of claim 19, wherein the presentation of a plurality of spinable reels spins about a substantially horizontal axis, and wherein at least one of the base award adjusters spins about a substantially vertical axis.

22. The gaming machine of claim 19, wherein the presentation of a plurality of spinable reels spins about a substantially horizontal axis, and wherein at least one of the base award adjusters spins in a top box game.

23. The gaming machine of claim 19, wherein the base game requires three coins to initiate base game play, the first base award adjuster requires a forth coin to initiate first adjuster play, and the second base award adjuster requires a fifth coin to initiate the second adjuster play.

24. The gaming machine of claim 19, wherein any first adjuster award from the first base award adjuster is added to any base game award from the base game.

25. The gaming machine of claim 19, wherein a first adjuster award from the first base award adjuster is awarded only if a base game award was awarded.

26. The gaming machine of claim 19, wherein a first adjuster award from the first base award adjuster is awarded regardless of whether a base game award was awarded.

27. The gaming machine of claim 19, wherein a second adjuster award from the second base award adjuster is a multiplier of the base pay award, if any, combined with the first adjuster award.

28. A gaming machine having a base game and two base award modifiers to modify a base game award in a single spin game, the gaming machine comprising:

a base game presentation of a plurality of spinable reels, wherein the outcome of the spinable reels in the base game presentation define a base game award, if any;

a first base award adjuster, wherein the outcome of the first base award adjuster defines one of a plurality of first adjuster awards, at least one of the first adjuster awards including a negative adjustment, and wherein the first adjuster award alters the base game award; and a second base award adjuster, wherein the outcome of the second base award adjuster defines one of a plurality of second adjuster awards, at least one of the second adjuster awards including a negative adjustment;

wherein the second adjuster award alters the combined base game award and first modifier award if the base game award is awarded and the second adjuster awards includes a non-negative adjustment, alters only the base game award if the base game award was awarded and the second adjuster award includes a negative adjustment, and alters only the first adjuster award if no base game award was awarded and the first adjuster award stands independently of a base game award;

wherein the first base award modifier and the second base award modifier are awarded regardless of whether the base game award is awarded;

wherein the plurality of spinable reels in the single spin base game, the spinable reel in the first single spin base award modifier, and the spinable reel in the second single spin base award modifier are all uniformly spin activated a single time, and are not subject to independent activation or re-activation; and wherein all spin activations of the spinable reels of the first and second single spin base award modifiers are in response to causing the single spin game to begin.

29. A gaming machine having a base game and two base award modifiers to modify a base game award in a single spin game, the gaming machine comprising:

a base game, wherein the outcome of the base game defines a base game award, if any;

means for modifying a first base award, wherein the outcome of the first base award modifying means defines a first modifier award, if any, and wherein the first modifier award adjusts the base game award, if any; and means for modifying a second base award, wherein the outcome of the second base award modifying means defines a second modifier award, if any;

wherein the second modifier award adjusts the combined base game award and the first modifier award, if both awards were awarded, adjusts only the base game award if only the base game award was awarded, and adjusts only the first modifier award if only the first modifier award was awarded, wherein the first base award modifier and the second base award modifier are awarded regardless of whether the base game award is awarded;

wherein the plurality of spinable reels in the single spin base game, the spinable reel in the first single spin base award modifier, and the spinable reel in the second single spin base award modifier are all uniformly spin activated a single time, and are not subject to independent activation or re-activation; and wherein all spin activations of the spinable reels of the first and second single spin base award modifiers are in response to causing the single spin game to begin.

* * * * *